United States Patent [19]

Carter et al.

[11] Patent Number: 4,538,240
[45] Date of Patent: Aug. 27, 1985

[54] METHOD AND APPARATUS FOR PERFORMING HASHING OPERATIONS USING GALOIS FIELD MULTIPLICATION

[75] Inventors: John L. Carter, Putnam Valley; George Markowsky, Mount Kisco; Mark N. Wegman, New York, all of N.Y.

[73] Assignee: International Business Machines Corporation, Armonk, N.Y.

[21] Appl. No.: 454,912

[22] Filed: Dec. 30, 1982

[51] Int. Cl.³ .................................................. G06F 7/52
[52] U.S. Cl. ...................................... 364/754; 364/715
[58] Field of Search ......................... 364/754, 757, 715

[56] References Cited

U.S. PATENT DOCUMENTS 4,037,093 7/1977 Gregg et al. .......................... 364/754
4,251,875 2/1981 Marver et al. ........................ 364/754
4,473,887 9/1984 Odaka ................................... 364/754

OTHER PUBLICATIONS

Laws, Jr. et al., "A Cellular-Array Multiplier for $GF(2^m)$", *IEEE Trans. on Computers*, Dec. 1971, pp. 1573-1578.

Primary Examiner—David H. Malzahn
Attorney, Agent, or Firm—Roy R. Schlemmer

[57] ABSTRACT

The invention comprises a method and apparatus for performing a hashing operation on an N bit number under control of a prespecified N bit hashing constant which comprises performing N/K finite field partial multiplications of the object to be hashed by the hashing constant, utilizing K logic and combinatorial circuits all of which operate in parallel to completely evaluate the number in N/K operations.

Another feature of the present invention is that the hashing constant loaded into the system may be changed at will with a resultant changing of the hashing characteristics to suit a particular class of objects to be hashed. This is done by a "select" operation. In the "select" operation, the hashing constant is sequentially loaded into said K logic and combinatorial circuits, each of which comprises a feedback shift register (FSR), said feedback shift registers being so configured that at the end of K operational sequences each of said feedback shift registers contains said hashing constant shifted and permuted in accordance with the particular feedback configuration of said register, a number of bits proportional to its location in the sequence of feedback shift registers, such that the hashing constant in the shift register $FSR_i$ will be shifted in a predetermined direction (i−1) N/K bit positions. Each of the operational sequences referred to above comprises a hashing sequence which includes N/K shifts of the feedback shift registers.

9 Claims, 10 Drawing Figures

HASH OPERATION AFTER PERFORMING FIRST SHIFT

FIG. 3.4

AFTER ACCUMULATING SECOND PARTIAL RESULT AND PERFORMING SECOND SHIFT

HASH OPERATION
AFTER ACCUMULATING
THIRD PARTIAL RESULT
AND PERFORMING THIRD
SHIFT

FIG. 3.5

FINAL STATUS OF REGISTERS
AFTER LOADING FSR FROM
REGISTERS ABOVE THEM
TO BE READY FOR NEXT
OPERATION.

FIG. 3.6

SELECT OPERATION
AFTER LOADING A-REGISTER
AND COPYING ITS VALUE
INTO FSR1
NOTE: REGISTERS WITH
NO VALUES INDICATED
ARE ARBITRARY

FIG. 4.1

AFTER PERFORMING FIRST HASH OPERATION
(IN THIS CASE, SINCE K=2, ONLY ONE HASH
OPERATION IS REQUIRED TO COMPLETE
THE SELECT OPERATION.)

FIG. 4.2

METHOD AND APPARATUS FOR PERFORMING HASHING OPERATIONS USING GALOIS FIELD MULTIPLICATION

BACKGROUND OF THE INVENTION

The present invention relates to the design of a hardware implemented device to perform a "hash" operation in a digital computer. The essential purpose of a hash function is to transform an unknown and possibly skewed distribution of values into a more uniform distribution, often over a smaller range of values. One application of a hash function is in an associative memory. Here, an identifier, such as a person's name or account number, is transformed by a hash function into an address in a computer's memory which is used as a starting point for a search for the data associated with the identifier. For the associative memory to perform efficiently, it is important that the addresses given by the hash functions be spread relatively evenly over the possible addresses, even when the identifiers are highly correlated. There are many other uses of hash functions, including uses in operating systems, compilers, interpreters, data base management, cryptographic schemes, spelling checkers, error correction and detection schemes, etc.

In addition to the above noted uses of a hash function another very important utilization is for the efficient translation of virtual addresses to main storage real addresses by means of a hash index table which contains main storage addresses. A hashing function is provided for generating a uniform distribution of hash index table entry addresses from a nonuniform distribution of virtual addresses in a data processing system, where the size of the hash index table is variable and is based on the size of main storage. If an adequate hashing function is chosen, the hash index table may be kept to a minimum size and used or filled very efficiently.

For a much more detailed description of the use of hashing refer to the following three publications: (1) Donald E. Knuth, "The Art of Computer Programming," Vol. III (Sorting and Searching). Addison-Wesley Publishing Company, Menlo Park, Calif. (1973); (2) Aho, Hopcroft and Ullman, "The Design and Analysis of Computer Algorithms," Addison-Wesley Publishing Company, Menlo Park, Calif. (1974); (3) M. N. Wegman and J. L. Carter, "New Hash Functions and Their Use in Authentication and Set Equality," Journal of Computer and System Sciences, Vol. 22, pp. 265-279 (June 1981).

Hash functions are usually implemented in software (that is, by a computer program), however, according to the teachings of the present invention an extremely versatile circuit is provided to perform the hash operation. There are two significant advantages to making hardware perform hashing: firstly, the hashing operation can be speeded up substantially, and secondly, a significantly more sophisticated hashing procedure or algorithm can be economically used.

A potential disadvantage of performing hashing in hardware is a particular function chosen might perform poorly on a particular set of data.

That is, with a particular distribution of objects to be hashed, poorly distributed hashed output would be realized. Accordingly, in most known prior art systems hardware or fixed hashing has been utilized only where the input data has a more or less known, fixed characteristic. Conversely when more sophisticated hashing is required more complex and time consuming hashing algorithms have been embodied in software with a significant increase in the requisite time for performing such hashing operations.

DESCRIPTION OF PRIOR ART

As stated previously, performing hashing operations for the purposes of generating memory addresses is well known in the art. Similarly, Galois field multiplication is a well known mathematical procedure. The following references represent the best art known to the Applicants, however, no representation is made that this art is the closest anticipatory material on the subject.

U.S. Pat. No. 4,215,402 of Mitchell et al discloses a large computer memory system wherein certain addressing operations are accomplished through various types of hashing operations. However, no Galois field multiplication to achieve hashing is involved in this patent.

U.S. Pat. No. 4,162,480 of Berlekamp discloses a Galois field computer. However, this reference does not disclose a circuit organization in any way resembling that of the present circuit. Nor does this reference disclose using a separate loading operation combined with a precomputation of the various shifts of the hashing constant. U.S. Pat. No. 4,037,093 of Gregg et al and U.S. Pat. No. 3,805,037 of Ellison both disclose specific Galois field circuits which are in no way related to hashing operations nor do they disclose a circuit configuration resembling that set forth in the present invention.

SUMMARY OF THE INVENTION

It is the primary object of the present invention to provide a hardware implementation of an extremely efficient hashing procedure which provides excellent results near the theoretical limits and which would not normally be practically realizable utilizing software implementations for many applications.

It is a further object of the invention to provide such a hashing mechanism which is readily alterable in terms of changing the hashing constant whereby the performance of the circuit may be significantly altered to tailor the system, with very little delay, for an input stream of numbers (objects to be hashed) having a significantly different distribution characteristic.

It is yet another object of the invention to provide such a hashing circuit which may be readily implemented in current technology large scale or very large scale integration circuitry and which operates with very little delay.

Other objects, features and advantages of the invention will be apparent from the following description of the preferred embodiment of the invention.

The objects of the present invention are accomplished in general by the herein disclosed hashing generator which is capable of performing a highly parallel Galois field multiplication of an N-bit object to be hashed under the control of an N-bit hashing constant. The generator comprises an N-bit standard shift register for storing the N-bit object to be hashed and an N-bit register for storing the hashing constant. A conventional N-bit output register is also utilized for accumulating the result of the hashing operation. K N-bit feedback shift registers are utilized for storing rotated versions of the hashing constant. The contents of said shift registers are exclusive-OR'ed together under control of selected bits in said object register together with the current contents of the register to form an intermediate partial product. This operation continues N/K times at which time the current hashing object is completely evaluated and located in the Result register.

A significant feature of the circuitry is that, at the end of a hashing operation, the various shifts of the hashing constant are reloaded into the feedback shift registers by copying the final contents of register $FSR_i$ into register $FSR_{i+1}$ for i=1, 2, ..., K−1, and copying the hashing constant register into FSR1.

Another significant feature of the present hashing circuitry is that during a loading operation the various shifts of the hashing constant may be in effect precomputed and loaded into the feedback shift registers by a sequence of operations which are almost identical to the actual hashing operations insofar as the operation of the feedback shift registers is concerned. By performing this precomputation, the hashing constant is in effect partially multiplied and loaded into the feedback shift registers in proper format for the subsequent highly parallel hashing operation.

BRIEF DESCRIPTION OF THE DRAWINGS

FIGS. 3.1–3.6 comprise a tabular example of a "hash" operation, illustrating the data flow, in a simple version of the present hashing generator.

FIGS. 4.1 and 4.2 comprise a tabular example of a "select" operation, illustrating the data flow, in a simple version of the present hashing generator.

DESCRIPTION OF THE PREFERRED EMBODIMENT

According to the teachings of the present invention, the previous enumerated disadvantages of a hardware implemented hashing generator have been circumvented by the present design which allows a program to change its hashing function and thus the distribution characteristics by what is referred to herein as a "select" operation, in which a new hashing constant may be easily and quickly implemented. This has the effect of changing the output and thus the distribution of the hashed values. This feature is not known to exist in any prior hardware hashing generators. In order to ensure that the distribution of values produced by the hash function have a high probability of being evenly distributed no matter what the input values are, the present invention incorporates the techniques of universal hashing. The essential idea of universal hashing is that for any set of values to be hashed, almost all of the possible choices of hash functions specified by the particular hashing constant utilized in the "select" operation will result in a relatively even distribution of output values. Thus, any randomly chosen hash function or constant is very likely to perform well. For a more in depth discussion of the underlying concepts of universal hashing reference is made to an article by J. L. Carter and M. N. Wegman, "Universal Classes of Hash Functions," Journal of Computer and System Sciences, Vol. 18, pp 143–154 (April 1979).

The herein disclosed hashing generator is readily adaptable to fabrication in integrated circuit chip technology and is designed to perform its two operations with a small amount of control hardware. The two operations are "select(A)" and "hash(B)" wherein A and B refer to the hashing function or constant (A) which is stored in register A of FIG. 1, and the hashing object or object to be hashed (B) which is stored in register B, FIG. 1. "Select(A)" specifies that the function denoted by the argument A (the hashing function) is to be used for all subsequent "hash" operations, until the next hashing constant is entered into the system and an appropriate "select" function executed. "Select" does not compute any result, but allows some precomputation to be performed by the hardware which will speed up all subsequent "hash" operations utilizing the same hashing constant. The "hash(B)" operation is the procedure which causes the argument B to be hashed by the hashing function A specified by the most recent "select" operation.

Figure 1:
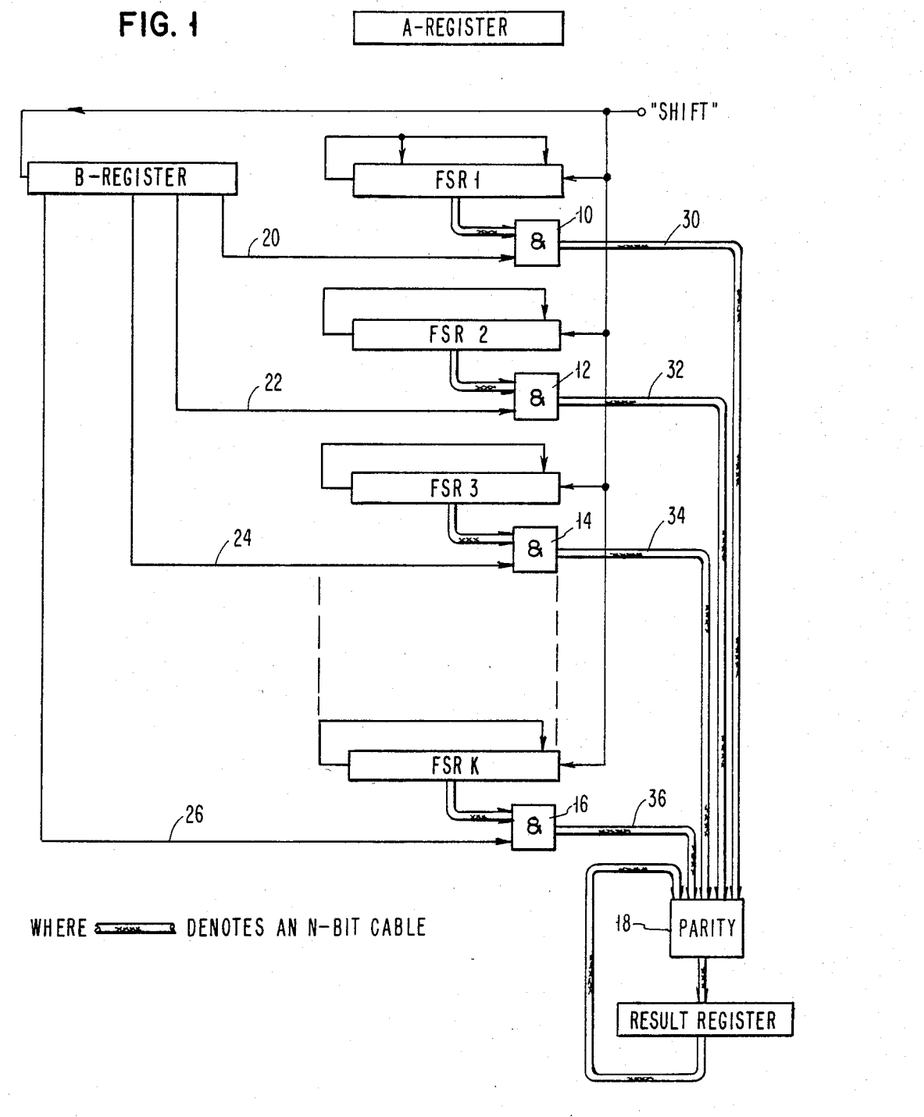
FIG. 1 comprises a combination functional block diagram and data flowchart of the present hashing generator.

It will be noted in the following description that N represents the number of bits per word, wherein the hashing constant A, the object to be hashed B, and the value returned by the "hash" operation are all similarly N-bit numbers. For purposes of the present embodiment it is assumed that one would desire an N-bit result as this is very useful for certain applications. However, for certain other uses specifically address hashing, it may be desired that the value returned by the hashing operation be in the range of 0, 1, 2, ... $2^M-1$, where M is less than N. If so, one can shift the result either right or left N−M bits so that the desired M bits would be available for the intended purpose. It should be noted that any other contiguous or discontiguous subset of M bits could similarly be chosen with equal reliability. The advantages of universal hashing wherein a good distribution of results may be expected for any input are retained after the shifting or some other bit selection procedure. The disclosed hashing generator actually performs the operation of multiplication in the finite field $GF(2^N)$. Referring to FIG. 1, the "select" operation sets the multiplier into the device in register A and allows some precomputation to be performed. The argument or object of the hashing operation which is loaded into register B of the disclosed embodiment is used as the multiplicand. Hardware to perform finite field arithmetic per se is not new. See for example, the previously referenced Berlekamp and Gregg et al patents and also the book "Algebraic Coding Theory," E. R. Berlekamp, McGraw Hill, New York (1968). The present method of obtaining speed up of the multiplication operation through precomputation and also allowing the multiplier or hashing constant to be changed is not believed to be taught in the prior art.

In the presently disclosed hashing generator the multiplication of field elements is performed in a manner very analogous to the ordinary multiplication of binary numbers. The multiplier is shifted left one bit position at a time and the value of said multiplier is added to the running total or not depending upon whether or not the bit of the multiplicand currently being evaluated is a 1 or a 0. The difference between the finite field arithmetic and ordinary arithmetic is firstly that the addition is performed by an exclusive-OR (XOR) operation and secondly that the shifts must be performed by a properly chosen feedback shift register which in effect alters the value of the bits of the multiplicand as the operation proceeds. This is, of course, significantly different from an ordinary shift register.

A very significant feature of the present hashing generator is that this finite field multiplication is speeded up by the evaluation of several bits of the multiplicand in parallel. The number of bits is determined, as will be seen, subsequently, by the number of feedback shift registers (FSRs) utilized.

In order to effectuate this operation it is necessary that a precomputation of the multiplier be performed in order to obtain proper alignment of the multiplier with the selected bits of the multiplicand.

As stated previously, the herein disclosed hashing generator may be implemented in any well known large scale integration (LSI) or very large scale integration (VLSI) technology. Thus all of the registers, data paths, combinatory logic, etc. could easily be placed on several LSI or a single VLSI chip.

In the subsequent description of the invention the following terminology is used. N represents the number of bits in a machine word. Thus this is the number of bits in the A register which holds the hashing constant (multiplier) as well as the B register which holds the object to be hashed or multiplicand. Similarly, all of the feedback shift registers 1 through K and the Result register are all N-bits wide. All of the AND gates 10 through 16 shown in FIG. 1 in essence, comprise N individual AND gates having as one input N bits from the associated feedback shift register and as a second input the appropriate bit from the B register which controls the AND function. Block 18 marked parity comprises a collection of N parity circuits which produce a logical "1" upon the occurrence of an odd number of "1"s at the circuit input terminals and a logical "0" upon the occurrence of a even number of "1"s at the circuit input terminals. Each of the N parity circuits receives an appropriate input from the corresponding bit from each of the K feedback shift registers and also from the Result register. Thus the i-th parity block receives the i-th bit from each of the K feedback shift registers, as well as the i-th bit from the Result register. The output of the block 18 comprises again N-bits which are gated into and replace the former contents of the Result register.

The number K, as indicated previously, is the parameter which affects the size and speed of the design. The larger the value of K the more individual components will be required on the chip but the faster the "hash" operation will be due, of course, to the greater degree of parallelism in the multiplication operation. Referring specifically to FIG. 1, it may be seen readily that the number K is determined by the number of the feedback shift registers utilized in the design. Since each shift register evaluates N/K bits of the object to be hashed it follows that K should ideally be an integer divisor of N. In other words if N=32 K could have the value 2, 4, 6, 8 or 16.

As stated above, all of the registers in the embodiment shown in FIG. 1 are N-bit registers, the A register which stores the hashing constant and the Result register which receives the intermediate and the final results of the hashing operation are simple registers which may be accessed essentially in parallel. The B register is a shift register having K output lines as shown and shifting from left to right under control of the "shift" signal shown. The feedback shift registers FSR1 through FSRK are, as the name implies, shift registers which in the described embodiment shift from right to left, as indicated by the direction of the "shift" line over which an appropriate shift signal is provided. Additionally, the feedback shift registers shift the left most bit back into the right most position, and also modify certain other bit positions (as will be described below). As stated previously, the design of such shift registers is known and is specifically discussed in greater detail in the previously referenced Berlekamp book on page 47.

To design a suitable feedback shift register of size N, one first chooses an irreducible polynomial of degree N over the field GF (2). A book by W. W. Peterson and E. J. Weldon, Jr., "Error Correcting Codes," MIT Press, Cambridge, Mass., (1971), discloses tables of such polynomials for different sizes of N on pages 251 through 270. Any choice of a polynomial for a given value of N is suitable, however, one with a minimal number of non "0" coefficients is the most practical as can be seen from the following discussion.

The FSR consists of an N-bit shift register with positions numbered 0, 1, 2, ..., N−1 from right to left. A shift consists of moving the i-th bit into the (i+1)-th bit, and also exclusive-ORing the bit in position N−1 into several of the other bit positions of the FSR. The positions into which this bit gets exclusive-OR'd are the bit positions representing those exponents of the chosen irreducible polynomial which have non "0" coefficients (except for the high-order coefficient). For instance, if the polynomial were $X^6+X^3+1$ then the bit in position 5 would be fed back into bit positions 3 and 0. Notice that the new value in bit position 3 would be derived from both positions 2 and 5 as described above. These two values are combined via an exclusive-OR operation. However, no exclusive-OR is needed for bit position 0 since there is no other bit coming into that position.

Figure 2:
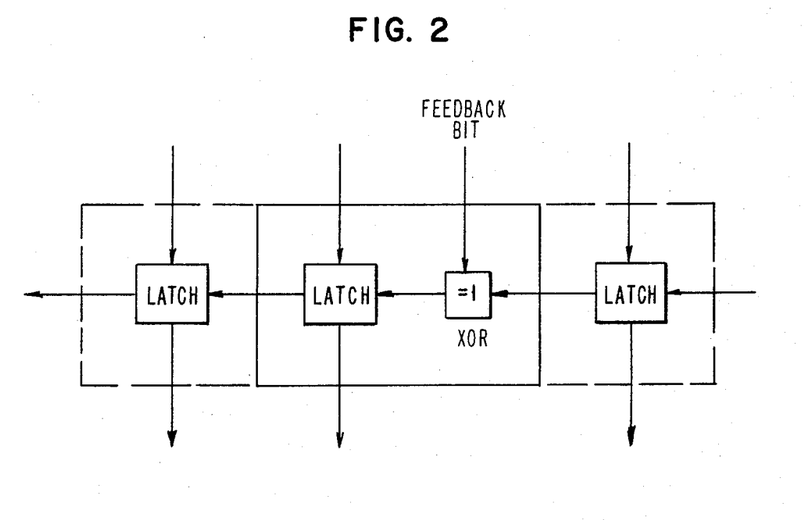
FIG. 2 comprises a logical schematic diagram of a typical register bit storage location which receives a feedback bit within the feedback shift registers and must perform an exclusive-OR operation.

FIG. 2 is shown for the purpose of illustrating the internal contents of one of the bit positions of the FSR which receives a feedback bit. It also shows the two adjacent bit positions. This FIGURE illustrates in logical schematic form how the feedback bit enters the particular bit position (other than the 0-th bit position for which no exclusive-ORing occurs) and is exclusive-OR'd with the bit immediately to the right of the feedback location to produce a resultant output value which is stored in the latch connected to the output of the exclusive-OR. Operation of such a circuit is considered completely straightforward and well understood by those skilled in the art.

Returning briefly to the B register, it will be specifically noted that outputs are specifically taken from the 0-th, (N/K)-th, (2N/K)-th, ... bit positions. Referring briefly to FIGS. 3 (3.1 through 3.6) and 4 (4.1 and 4.2) for a value of N=6 and K=2, the outputs from the B register are taken from the zero-th and third bit positions as described above.

Figure 41:
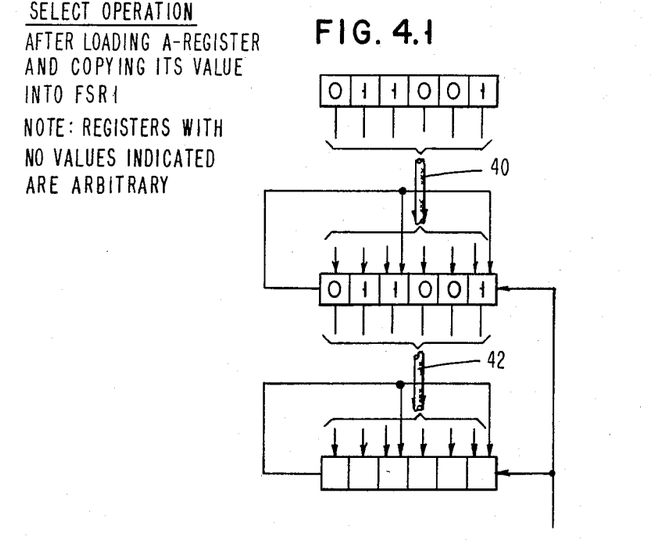
Figure 42:
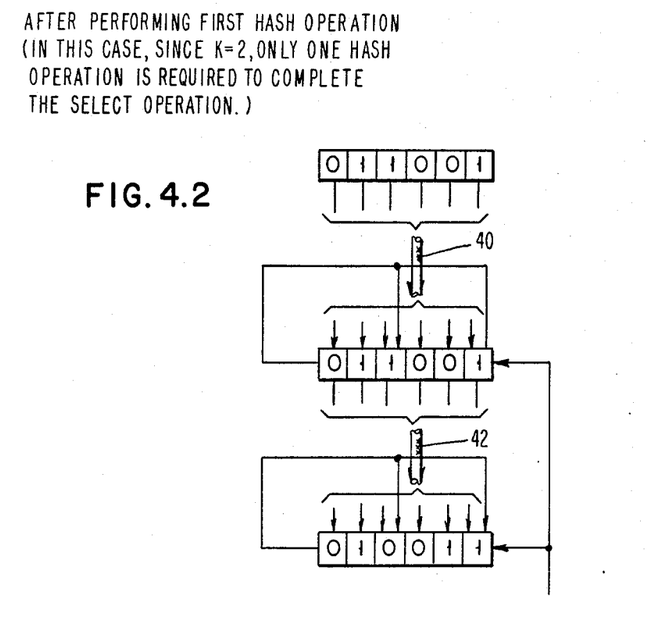

It should also be noted in passing that the A register which holds the hashing constant and all of the feedback shift registers in addition to being shift registers are assumed to have the capability of being loaded and unloaded in parallel. This circuitry is not shown in FIG. 1, as it would have made the drawing overly difficult to follow, however, it is shown functionally in the data flow diagram of FIGS. 4.1 and 4.2 which illustrate an example of the "select" operation which will be explained subsequently. Such registers are well known in the art. The capability allows the rapid transference of a complete N-bit number from the A register to FSR1, from FSR1 to FSR2, etc.

Referring again to FIG. 1, the heavy lines represent N-bit buses, and each of the AND gates 10 through 16 are actually a collection of AND gates arranged in parallel, one for each bit of the FSR register to which it is attached as described previously.

To very briefly describe the function of the logic circuitry of FIG. 1, assume that a shift operation has just been completed causing the B register to shift 1 bit to the right and all of the feedback shift registers to shift 1 bit to the left, the values appearing on all of the N-bit cables 30 through 36 will represent the current contents of the FSRs 1 through K. Where the binary value in those bit storage locations of the B register attached to lines 20 through 26 are logical "1s", the appropriate AND gates (10–16) would be activated allowing the current contents of the associated FSR (1-K) to be placed on lines 30–36. Alternatively, for those bit storage locations of the B register containing a logical "0", this value would be placed on the lines 20 through 26, where associated AND circuits 10 through 16 would not be activated and all "0s" would appear on the respective output lines 30 through 36. As stated previously, an additional or (K+1)-th input is applied to each of the N individual logic circuits within the parity block 18 to produce a new result which is placed in the Result register.

The particular way, in which this basic circuit operation is utilized iteratively to perform the "hash" operations will now be described.

In the "hash" operation an N-bit object operand is loaded into the B register. Before the operation is begun, both register A and FSR1 will contain the hashing constant A (as set by a previous "select" operation as will be described subsequently), and the values in each of the remaining FSR registers is the result of performing N/K feedback shift on the value in the register immediately above it. When the "hash(B)" operation is initiated, the N-bit object B is put into the B register and the Result register is set to all zeros. The contents of the Result register and the FSR registers are selectively combined in parity block 18 wherein it will be noted that the contents of each particular FSR register is gated through to block 18 only if the bit in the associated bit of B register is a logical "1". The output from block 18 is stored in the Result register. Next, a shift signal is applied to the system and the FSR registers shift their contents (with feedback) one bit position and similarly the B register also shifts one position. The current contents of the B register and all of the FSR registers as well as the Result register are now automatically combined, as described previously, via AND circuits 10 through 16 and parity block 18 to place a new value in the Result register. This process of logically combining the contents of the feedback shift registers and the Result register under control of the contents of B register followed by a one bit shift of the B register and the FSRs continues for a total of N/K times, at which point the entire object in the B register is evaluated. At this point the Result register will contain the desired answer of the hashing operation A*B.

At this point it is desirable to reset all of the FSR registers to the initialized state with the proper shifted values of the hashing constant A so that the next "hash" operation may take place. This is accomplished by shifting all of the FSR registers and the A register downward one position so that FSR1 contains the unrotated hashing constant A, FSR2 contains the previous contents of FSR1, etc. It will be noted that the former contents of shift register FSRK will simply be discarded. It also should be noted that the contents of the A register which is the hashing constant never change during the hashing operations.

The following program-like statement of operations in essence synopsizes the above described "hash" operation. It will be noted that the operation involves three basic steps, all described above, wherein step 2 is essentially a loop which is repeated N/K times before the process goes on to step 3. It is believed that this chart is completely self-descriptive and need not be described further.

(1) Load B register with object to be hashed and load Result register with all zeros;
(2) Repeat N/K time:
  XOR FSRs specified by appropriate bit of B register together with Result register, store into Result register;
  Shift B register and FSRs one bit;
(3) Move all FSRs and A register down one register position.

The "select" operation will now be described wherein a new hashing constant A is loaded into the A register and various shifts of the hashing constant A are in effect precomputed and loaded into the various FSRs so that subsequent "hash" operations may be performed with minimum delay and maximum parallelism. The argument or hashing constant A is loaded into the A register and then a complete "hash" operation is performed K−1 times. It should be remembered that each hash operation comprises N/K individual shift operations followed by a complete shifting downward of all of the FSR registers and the A register. Thus at the end of the "select" operation all of the FSR registers are loaded with the correct versions of the hashing constant rotated the correct number of times so that a "hash" operation on a particular object to be hashed may now be implemented.

It should be clearly understood that the "select" operation operates solely on the contents of the FSR registers and the A register. The contents of the B register and the Result register play no essential part in the "select" operation nor do the combinatorial circuits 10 through 16 and 18. In fact, these may be functionally omitted and for purposes of clarity in FIGS. 4 and 4.2 which show an example of a "select" operation on a simple hashing generator this has been done.

The following is a brief listing of the sequence of operations in a "select" operation similar to the above listing for a "hash" operation. As will be apparent there are three primary steps with the "select" operation which are clearly indicated and wherein the third step includes a loop which is repeated K−1 times. It will be noted that the contents of this loop are stated to be "hash". In this particular case, as is conventional in programming technology, this statement would call the complete "hash" operation set forth above and would repeat the said complete hashing operation a total of K−1 times in order to complete the "select" operation.

(1) Load A register with hashing constant A;
(2) Load FSR1 from A register;
(3) Repeat K−1 times
  HASH Op.

It should be noted that various changes in these operations could be made by those skilled in the art without significantly departing from the spirit and scope of the present invention. For example, in the "hash" procedure, step 3 could be relocated in the procedure and renumbered step 2, and step 2 would appropriately be renumbered step 3. Concurrently with this, step 2 of the "select" operation could be completely deleted and the system would work properly. Other, similiar changes could be made by those skilled in the art without departing from the teaching of the present invention.

FIG. 3 which comprises FIGS. 3.1 through 3.6 and FIG. 4 which comprises FIGS. 4.1 and 4.2 will now be briefly described to more clearly illustrate the operation of the present invention by actually placing particular binary values into the system for the hashing constant or argument A which is loaded into the A register and a particular object to be hashed loaded into the B register.

Figure 31:
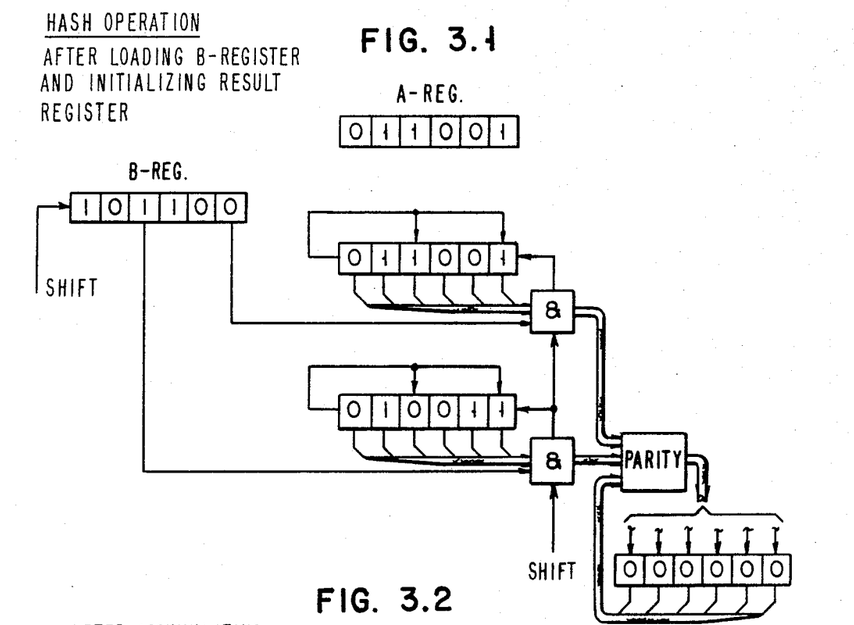
Figure 32:
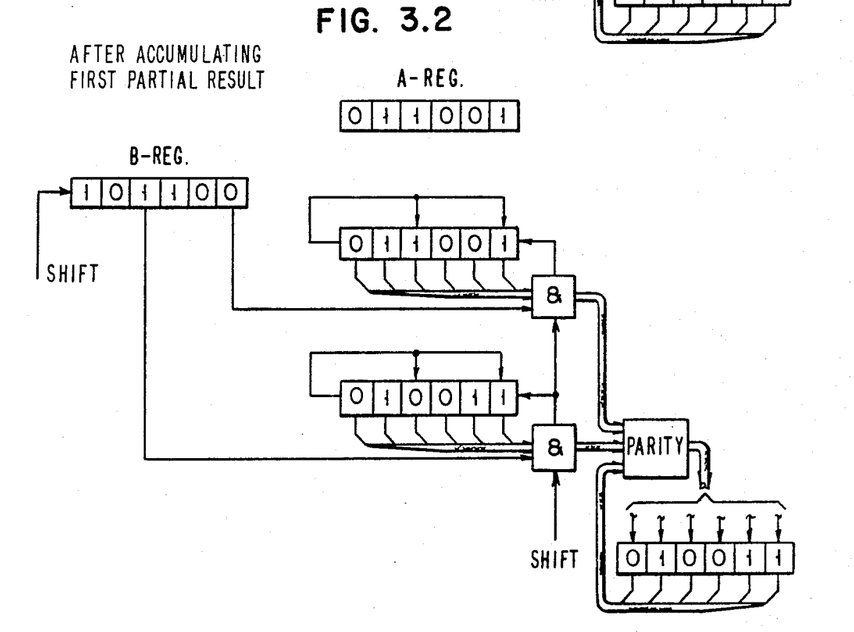
Figure 33:
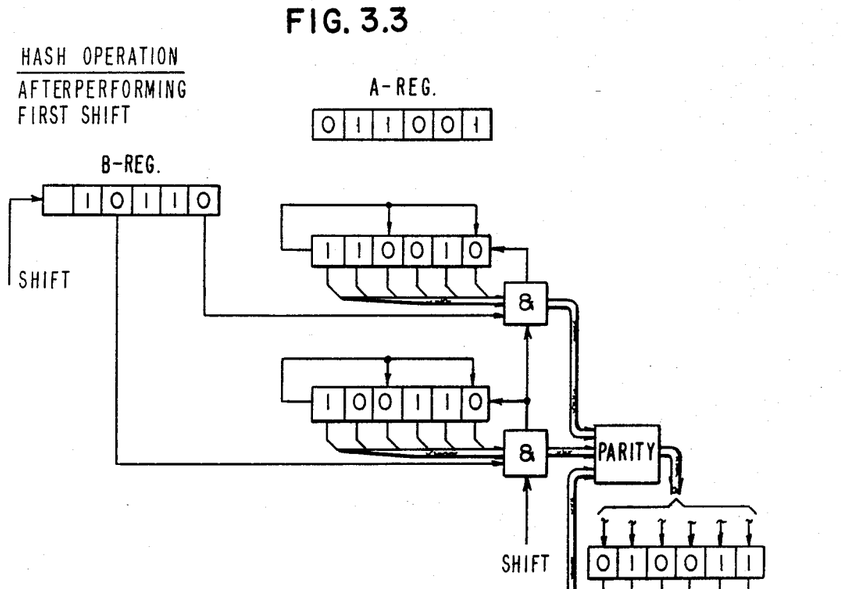
Figure 34:
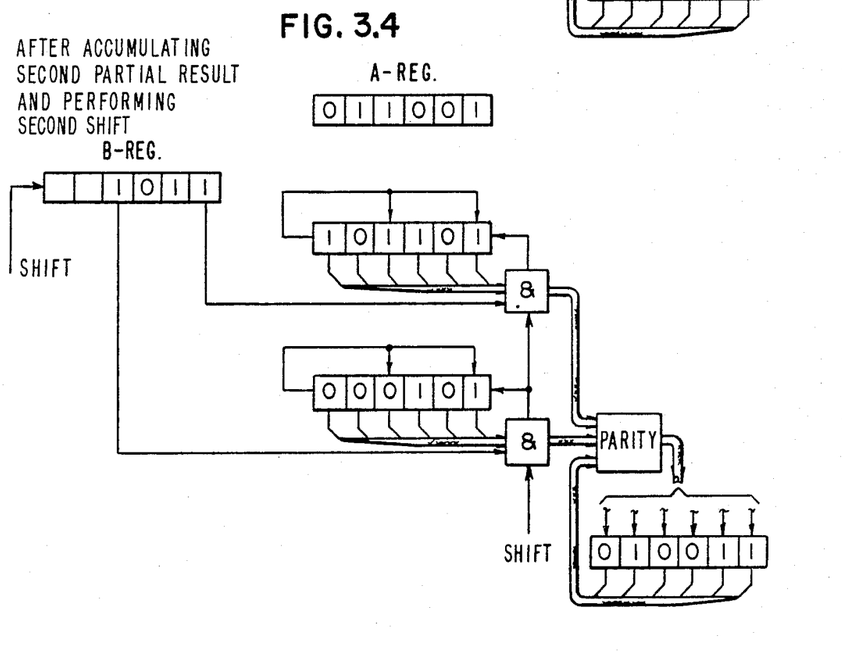
Figures 35, 36:
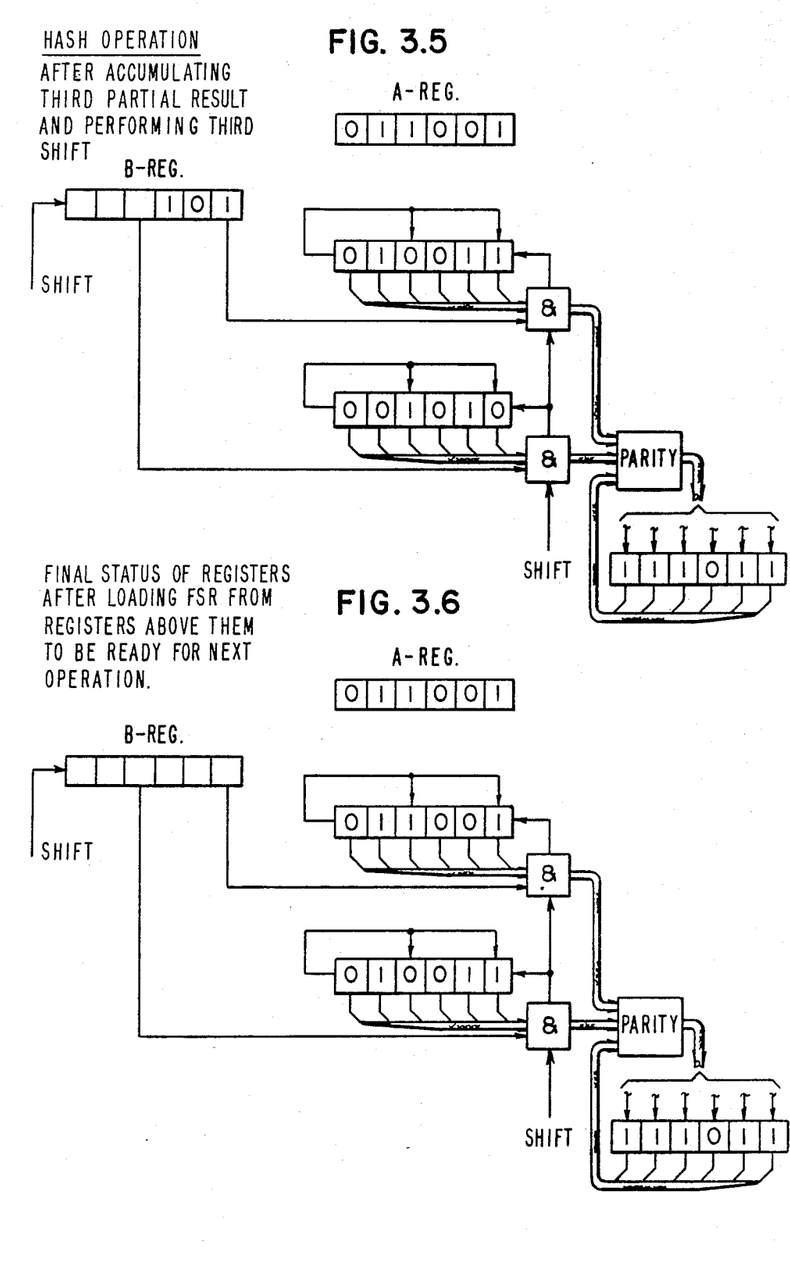

A "hash" operation is self-explanatory especially when taken into consideration of the legends accompanying each FIGURE. Thus one may readily follow the progress of the hashing operation through these FIGURES until FIG. 3.5, at which point the object in the B register has been completely evaluated and produces the result 111011. Similarly, in FIG. 3.6 it may readily be seen how the contents of the FSR registers have been moved and that they now are identical to the contents of the FSR registers in FIG. 3.1 which represented the initial state. At this point the new object to be hashed may be gated into the B register and another hashing operation performed.

Referring briefly to FIGS. 4.1 and 4.2 it will be noted that all non-functional and thus unnecessary circuitry has been deleted from these FIGURES and instead the two N bit cables 40 and 42 connecting the A register and the FSR registers are shown to indicate the path by which the contents of the A register and FSR registers are sequentially moved downwardly as the final step of each "hash" operation is performed during the "select" phase of the hashing circuitry's operation. As in FIGS. 3.1 through 3.6, the legends accompanying FIGS. 4.1 and 4.2 clearly indicate what has happened in each of the illustrated cases. It should be noted in FIG. 4.2 that all of the FSRs have been loaded and the system is ready to perform the first "hash" operation.

CONCLUSIONS

The above description of the preferred embodiment of the invention taken together with the simplified examples of FIGS. 3 and 4 would allow one skilled in the art to build a hashing generator following the teachings of the present invention, suitable for most any hashing purpose.

It is to be understood specifically that the simple version of the system as shown in FIGS. 3 and 4 was for the purpose of illustration only and that in fact values of N on the order of 32 would be more common and a typical value for K, the number of feedback shift registers, would probably be 4 or 8. In addition, as stated previously in the specification, for a given value of N more than one irreducible polynomial would probably exist and any of the required configurations of the shift registers could be utilized. However, the optimal configuration would probably be one with the fewest feedback points which would reduce the cost of the circuitry.

In addition, other minor hardware modifications could be made, for example, the relative directions of shifting and the designation of high and low order bit positions is also arbitrary and a matter of design, it being kept in mind only that the complete Galois field multiplication must occur.

A second modification would be choosing K to be a number which is not a divisor of N. This would necessitate an addition to register B which would provide a zero bit into the left most bit position each time a shift is performed.

A third modification is the use of the B register to count the number of times the hash operation is performed during the execution of a "select" operation.

These and other modifications could readily be made by those skilled in the art without departing from the spirit and scope of the invention as set forth in the following claims.

Having thus described our invention, what we claim as new, and desire to secure by Letters Patent is:

1. A hashing generator for performing a hashing operation on an N bit operand as a function of a predetermined N bit hashing constant, said generator comprising a shift register for receiving the operand to be hashed, a register for receiving and storing the hashing constant, K feedback shift registers wherein K is an integer factor of N, means for loading each of said K feedback shift registers with said hasing constant shifted from the low to the high order direction N/K-bit positions with respect to each of its adjacent feedback shift registers, means including a result register and combinatorial circuit means for accumulating the contents of each of said K feedback shift registers as a function of the binary state of an associated bit in said operand shift register together with the results of the immediately preceding accumulation and means for sequentially shifting all of said K feedback shift registers and said operand shift register and successively accumulating the interim results in said result register a total of N/K times to perform a complete hashing operation.

2. A hashing generator as set forth in claim 1 wherein the i-th feedback shift register has its output accumulated as a function of the state of the $(i-1)\times N/K$ bit position of said operand shift register and means for sequentially shifting said operand shift register so that the contents therein are shifted in a direction from the high to low order bit positions.

3. A hashing generator as set forth n claim 2 wherein the combinatorial circuit means for combining the current values in the feedback shift registers includes K N-bit AND gates or equivalent circuitry each of which is controlled by the state of an associated bit of the operand shift register, and a (K+1) input parity block, the output of all of siad K AND gates forming K inputs to said parity block wherein the (K+1)-th input comprises the current state of said accumulation means.

4. A hashing generator as set forth in claim 3 including means operable during a "select" mode of operation of the hashing generator for preloading the K feedback shift registers which includes means for gating the complete contents of the hashing constant register into the first feedback shift register and the contents of the i-th feedback shift register into the (i+1)-th feedback shift register and for selectively causing each of said K feedback shift registers to shift N/K bit positions with respect to its adjacent feedback shift register.

5. A hashing generator as set forth in claim 4 including means for introducing a predetermined hashing constant into the hashing constant register and for performing said "select" operation whereby the hashing generator will produce a different distribution of output values as a functioning of a different hashing constant.

6. A hashing generator as set forth in claim 5 wherein each of said feedback shift registers comprises bits designated 0, 1, 2 ... N−1 and means for shifting the i-th bit into the (i+1)-th bit position and also exclusive-ORing the bit in position N−1 into those bit positions which represent the coefficient of an irreducible polymonial of degree N which have a non-zero value except for bit position 0, and shifting the bit in position N−1 directly into bit position 0.

7. A hashing generator for performing a hashing operation on an N bit operand as a function of a predetermined N bit hashing constant, said generator comprising a shift register for receiving the operand to be hashed, a register for receiving and storing the hashing constant, K feedback shift registers wherein K is not an integer factor of N, means for loading each of said K feedback shift registers with said hashing constant shifted from the low to the higher order direction L bit positions with respect to each of its adjacent feecback shift registers where L is the greatest integer less than N/K, means for loading a zero into the high order bit position of the operand shift register each time a shift is performed, means including a result register and combinatorial circuit means for accumulating the contents of each of said K feedback shift registers as a function of the binary state of an associated bit in said operand shift register together with the results of the immediately preceding accumulation and means for sequentially shifting all of said K feedback shift registers and said operand shift register and successively accumulating the interim results in said result register a total of L times to perform a complete hashing operation.

8. A hashing generator as set forth in claim 7 including means operable during a "select" mode of operation of the hashing generator for preloading the K feedback shift registers which includes means for gating the complete contents of the hashing constant register into the first feedback shift register and the contents of the i-th feedback shift register into the (i+1)-th feedback shift register and for selectively causing each of said feedback shift registers to shift L bit positions with respect to its adjacent feedback shift register.

9. A hashing generator as set forth in claim 8 wherein each of said feedback shift registers comprises bits designated 0, 1, 2 ... N−1 and means for shifting the i-th bit into the (i+1)-th bit position and also exclusive-ORing the bit in position N−1 into those bit positions which represent the coefficient of an irreducible polymonial of degree N which have a non-zero value except for bit position 0, and shifting the bit in position N−1 directly into bit position 0.

* * * * *